United States Patent
Ding et al.

(10) Patent No.: US 9,348,520 B2
(45) Date of Patent: May 24, 2016

(54) LIFETIME EXTENSION OF NON-VOLATILE SEMICONDUCTOR MEMORY FOR DATA STORAGE DEVICE

(71) Applicant: Western Digital Technologies, Inc., Irvine, CA (US)

(72) Inventors: Lu Ding, Newport Beach, CA (US); Choo-Bhin Ong, Foothill Ranch, CA (US); Chandra M. Guda, Irvine, CA (US); Michael C. Kutas, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 86 days.

(21) Appl. No.: 14/266,234

(22) Filed: Apr. 30, 2014

(65) Prior Publication Data

US 2015/0268872 A1    Sep. 24, 2015

Related U.S. Application Data

(60) Provisional application No. 61/969,651, filed on Mar. 24, 2014.

(51) Int. Cl.
*G06F 3/06*    (2006.01)

(52) U.S. Cl.
CPC ............ *G06F 3/0616* (2013.01); *G06F 3/0655* (2013.01); *G06F 3/0679* (2013.01)

(58) Field of Classification Search
CPC ... G06F 3/0616; G06F 3/0655; G06F 3/0679; G06F 12/0246; G06F 2212/7204
See application file for complete search history.

(56) References Cited

U.S. PATENT DOCUMENTS

| | | | |
|---|---|---|---|
| 6,856,556 B1 | 2/2005 | Hajeck |
| 7,126,857 B2 | 10/2006 | Hajeck |
| 7,430,136 B2 | 9/2008 | Merry, Jr. et al. |
| 7,447,807 B1 | 11/2008 | Merry et al. |
| 7,502,256 B2 | 3/2009 | Merry, Jr. et al. |
| 7,509,441 B1 | 3/2009 | Merry et al. |
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |

(Continued)

FOREIGN PATENT DOCUMENTS

WO    2009070196 A1    6/2009

OTHER PUBLICATIONS

International Search Report and Written Opinion dated Jun. 19, 2015 from related PCT Serial No. PCT/US2015/021850, 11 pages.

*Primary Examiner* — Edward Dudek, Jr.

(57) ABSTRACT

Lifetime extension of a non-volatile semiconductor memory (NVSM) for a data storage device (DSD) includes determining a write amplification factor based on an amount of data previously written to the NVSM and at least one of an amount of data previously requested to be written to the DSD, and an amount of data previously requested to be written to the NVSM. At least a portion of the amount of data to be written to the NVSM is directed or redirected to the disk based on the determined write amplification factor.

24 Claims, 8 Drawing Sheets

(56) References Cited

U.S. PATENT DOCUMENTS

| | | |
|---|---|---|
| 7,962,792 B2 | 6/2011 | Diggs et al. |
| 8,046,551 B1 | 10/2011 | Sahin |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,230,164 B2 | 7/2012 | Danilak |
| 8,230,183 B2 | 7/2012 | Danilak |
| 8,230,184 B2 | 7/2012 | Danilak |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,339,881 B2 | 12/2012 | Danilak |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,429,343 B1 | 4/2013 | Tsai |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,504,783 B2 | 8/2013 | Danilak |
| 8,516,166 B2 | 8/2013 | Stenfort |
| 8,521,972 B1 | 8/2013 | Boyle et al. |
| 8,549,236 B2 | 10/2013 | Diggs et al. |
| 8,560,759 B1 | 10/2013 | Boyle et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2010/0169588 A1 | 7/2010 | Sinclair |
| 2010/0174849 A1 | 7/2010 | Walston et al. |
| 2010/0250793 A1 | 9/2010 | Syu |
| 2011/0099323 A1 | 4/2011 | Syu |
| 2011/0283049 A1 | 11/2011 | Kang et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0042030 A1 | 2/2013 | Jeddeloh |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |
| 2015/0032921 A1* | 1/2015 | Malkin ............. G06F 3/0613 710/74 |
| 2015/0055243 A1* | 2/2015 | Ehrlich ............. G06F 3/0625 360/69 |

* cited by examiner

LIFETIME EXTENSION OF NON-VOLATILE SEMICONDUCTOR MEMORY FOR DATA STORAGE DEVICE

CROSS-REFERENCE TO RELATED APPLICATION(S)

This application claims the benefit of U.S. Provisional Application No. 61/969,651, filed on Mar. 24, 2014, which is hereby incorporated by reference in its entirety.

BACKGROUND

Data storage devices (DSDs) are often used to record data onto or to reproduce data from a storage media. Some DSDs include multiple types of storage media. For example, in the case of a solid-state hybrid drive (SSHD), a non-volatile semiconductor memory (NVSM) such as a solid-state drive (SSD), a flash memory, and/or a NAND memory may be utilized in addition to a rotating magnetic disk for storing data.

A host may access the NVSM relatively frequently in an SSHD. Write amplification (WA) is an undesirable characteristic associated with the NVSM where the actual amount of physical data written to the NVSM is greater than the logical amount intended to be written by a host. WA may be due to various factors including erasing of data before rewriting the data in the NVSM and/or moving (or rewriting) the data more than once. Since a practical usable life of the NVSM is limited to a finite number of program erase cycles (PECs), WA shortens the practical life of the NVSM by increasing the number of writes required over the life of the NVSM. If a host and/or a controller access the NVSM frequently and/or WA is too high, the NVSM may prematurely suffer a significant or sudden decrease in performance.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1:
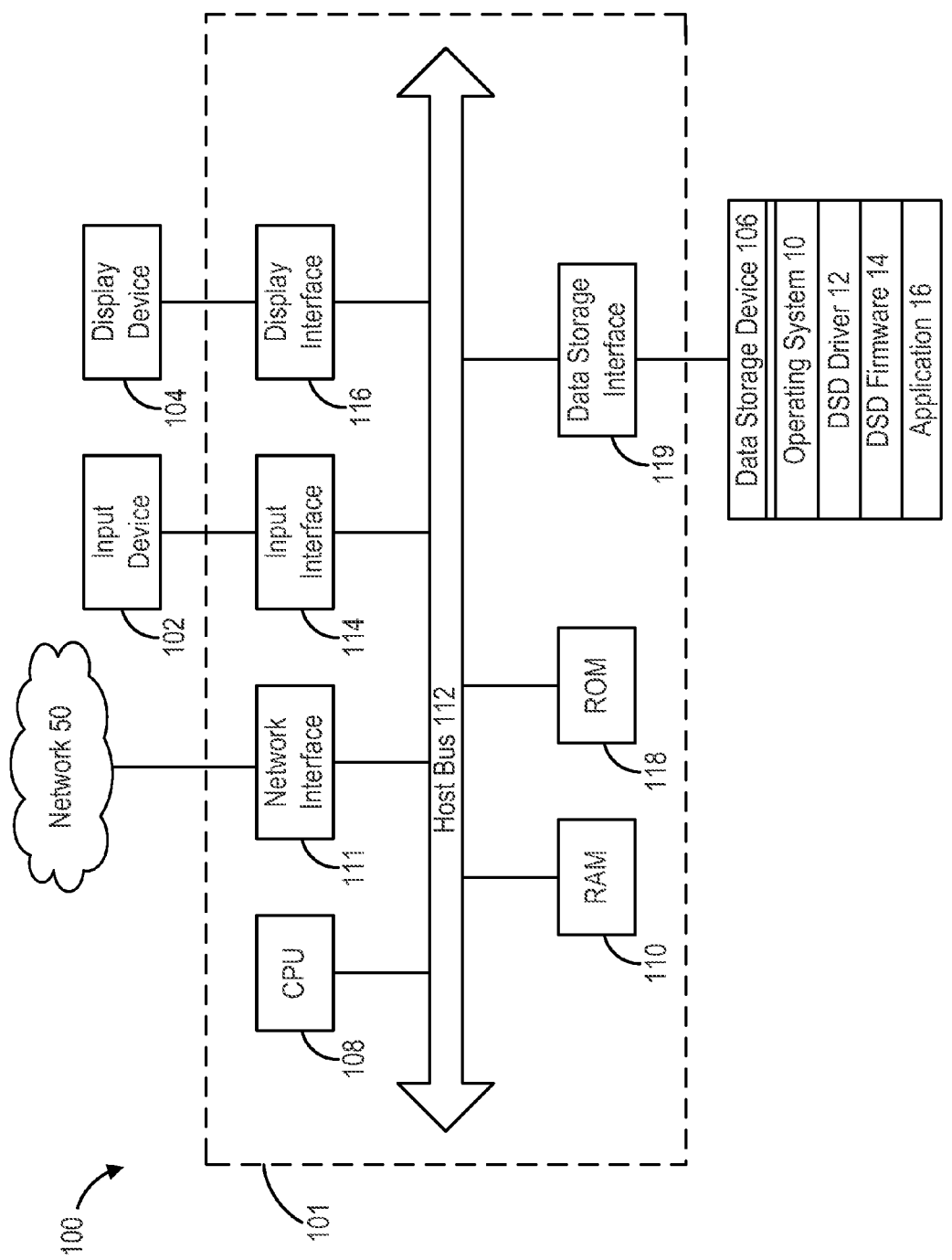
FIG. 1 is a block diagram depicting a system with a data storage device (DSD) according to an embodiment.

FIG. 1 shows system 100 according to an embodiment which includes host 101, input device 102, display device 104 and Data Storage Device (DSD) 106. System 100 can be, for example, a computer system (e.g., server, desktop, mobile/laptop, tablet, smartphone, etc.) or other electronic device such as a digital video recorder (DVR). In this regard, system 100 may be a stand-alone system or part of a network, such as network 50, which can, for example, be a local or wide area network or the Internet.

Those of ordinary skill in the art will appreciate that system 100 can include more or less than those elements shown in FIG. 1 and that the disclosed processes can be implemented in other environments Input device 102 can be a keyboard, scroll wheel, or pointing device allowing a user of system 100 to enter information and commands to system 100, or to allow a user to manipulate objects displayed on display device 104. In other embodiments, input device 102 and display device 104 can be combined into a single component, such as a touch-screen that displays objects and receives user input.

In the embodiment of FIG. 1, host 101 includes Central Processing Unit (CPU) 108 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. CPU 108 interfaces with host bus 112. Also interfacing with host bus 112 are Random Access Memory (RAM) 110, input interface 114 for input device 102, display interface 116 for display device 104, Read Only Memory (ROM) 118, network interface 111, and data storage interface 119 for DSD 106.

RAM 110 is a volatile memory of host 101 that interfaces with host bus 112 so as to provide information stored in RAM 110 to CPU 108 during execution of instructions in software programs such as Operating System (OS) 10, DSD driver 12, or application 16. More specifically, CPU 108 first loads computer-executable instructions from DSD 106 or another DSD into a region of RAM 110. CPU 108 can then execute the stored process instructions from RAM 110. Data such as data to be stored in DSD 106 or data retrieved from DSD 106 can also be stored in RAM 110 so that the data can be accessed by CPU 108 during execution of software programs to the extent that such software programs have a need to access and/or modify the data.

As shown in FIG. 1, DSD 106 can be configured to store one or more of: OS 10, DSD driver 12, DSD firmware 14, and application 16. DSD driver 12 provides a software interface for DSD 106 on host 101. DSD firmware 14 includes computer-executable instructions for DSD 106 that control operation of DSD 106 when executed by a controller of DSD 106 (e.g., controller 120 in FIG. 2).

Application 16 can be, for example, a program used by host 101 as a tool for interfacing with DSD 106 or a portion of DSD 106. In one implementation, application 16 is an application for a secondary storage device of DSD 106 including a solid-state memory (i.e., non-volatile semiconductor memory (NVSM) 142 in FIG. 2) and a controller for the solid-state memory (i.e., controller 120 in FIG. 2). In such an implementation, use of application 16 can provide host 101 with diagnostic and use information about the solid-state memory of DSD 106.

Data storage interface 119 is configured to interface host 101 with DSD 106 and interfaces according to a Serial Advanced Technology Attachment (SATA) standard. In other embodiments, data storage interface 119 can interface with DSD 106 using other standards such as, for example, PCI express (PCIe) or Serial Attached SCSI (SAS).

Although FIG. 1 depicts the co-location of host 101 and DSD 106, in other embodiments the two need not be physically co-located. In such embodiments, DSD 106 may be located remotely from host 101 and connected to host 101 via a network interface such as network interface 111.

Figure 2:
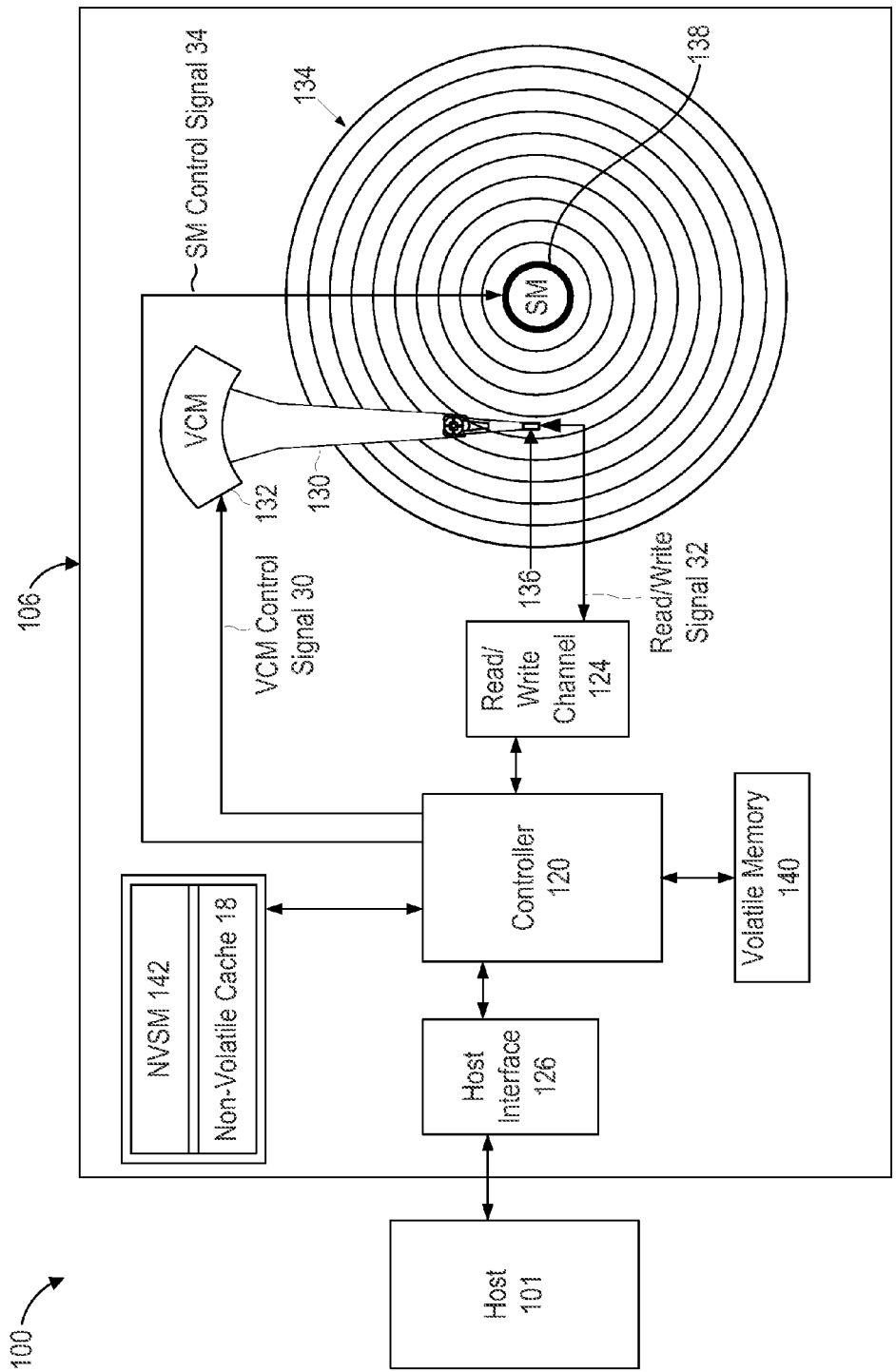
FIG. 2 is a block diagram depicting the DSD of FIG. 1 according to an embodiment.

FIG. 2 shows electronic system 100 which includes host 101 and data storage device (DSD) 106 in communication with host 101, according to an embodiment.

In the embodiment of FIG. 2, DSD 106 is a solid-state hybrid drive (SSHD) that includes both magnetic recording media (e.g., disks in disk pack 134) and solid-state recording media such as NVSM 142 for storing data. In other embodiments, the DSD 106 can include at least one SSHD in addition to one or more disk packs 134. In other embodiments, each of disk pack 134 or NVSM 142 may be replaced by multiple hard disk drives (HDDs) or multiple solid-state drives (SSDs), respectively, so that DSD 106 includes pools of HDDs and/or SSDs.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

DSD 106 includes controller 120 which includes circuitry such as one or more processors for executing instructions and can include a microcontroller, a DSP, an ASIC, an FPGA, hard-wired logic, analog circuitry and/or a combination thereof. In one implementation, controller 120 can include a system on a chip (SoC). In one embodiment, an NVSM controller may be utilized that operates in conjunction with controller 120.

Host interface 126 is configured to interface DSD 106 with host 101 and may interface according to a standard such as, for example, PCI express (PCIe), serial advanced technology attachment (SATA), or serial attached SCSI (SAS). As will be appreciated by those of ordinary skill in the art, host interface 126 can be included as part of controller 120. Although FIG. 2 depicts the co-location of host 101 and DSD 106, in other embodiments the two need not be physically co-located. In such embodiments, DSD 106 may be located remotely from host 101 and connected to host 101 via a network interface.

In the example of FIG. 2, DSD 106 includes rotating magnetic disks arranged in disk pack 134 which is rotated by spindle motor (SM) 138. DSD 106 also includes head stack assembly (HSA) 136 connected to the distal end of actuator 130 which is rotated by voice coil motor (VCM) 132 to position HSA 136 in relation to disk pack 134. Controller 120 can include servo control circuitry (not shown) to control the position of HSA 136 and the rotation of disk pack 134 using VCM control signal 30 and SM control signal 34, respectively. DSD 106 may include firmware stored on disk pack 134 and/or NVSM 142. Firmware can include computer-readable instructions used by DSD 106 to control the operation of DSD 106.

Disk pack 134 comprises multiple disks that are radially aligned so as to rotate about SM 138. Each disk in disk pack 134 includes a number of radially spaced, concentric tracks for storing data. HSA 136 includes multiple heads each arranged to read data from and write data to a corresponding surface of a disk in disk pack 134.

Data may also be stored in NVSM 142 which includes non-volatile cache 18. In one embodiment, non-volatile cache 18 is used to store cached data which may be identical data to, or a most recent copy of, data for selected ranges of logical block addresses (LBAs) on disk pack 134. Cached data can include data that is only stored in the NVSM 142 and/or is a most recently written version of data for a particular logical address such as an LBA. Such cached data may be referred to as "dirty data," which is periodically synchronized with the disk pack 134 by writing the dirty data to disk pack 134 for the logical address. In one example, dirty data may result from a deferred write operation where data intended to be written to disk pack 134 is first stored in the NVSM 142.

DSD 106 may also include volatile memory 140. Volatile memory 140 can include, for example, a dynamic random access memory (DRAM) which can be used by DSD 106 to temporarily store data. Data stored in volatile memory 140 can include data read from non-volatile memories (NVMs) (which may include disk pack 134 and NVSM 142), data to be written to NVMs, instructions loaded from firmware for execution by controller 120, and/or data used in executing firmware.

In operation, host interface 126 receives host read and write commands from host 101 via host interface 126 for reading data from and writing data to NVMs such as the NVSM 142 and disk pack 134. In response to a write command from host 101, controller 120 may buffer the data to be written for the write command in volatile memory 140.

For data to be written to disk pack 134, a read/write channel (not shown) of controller 120 may then encode the buffered data into write signal 32 which is provided to a head of HSA 136 for magnetically writing data to a disk surface of disk pack 134.

In response to a read command for data stored on a disk surface of disk pack 134, controller 120 controls a head of HSA 136 to magnetically read data stored on the surface of disk pack 134 and to send the read data as read signal 32. Read/write channel 124 of controller 120 can then decode and buffer the data into volatile memory 140 for transmission to host 101 via host interface 126.

For data to be stored in NVSM 142, controller 120 receives data from host interface 126 and may buffer the data in volatile memory 140. In one implementation, the data is then encoded into charge values for charging cells (not shown) of NVSM 142 to store the data.

In response to a read command for data stored in NVSM 142, controller 120 in one implementation reads current values for cells in NVSM 142 and decodes the current values into data that can be transferred to host 101. Such data may be buffered by controller 120 before transferring the data to host 101 via host interface 126.

Figure 3:
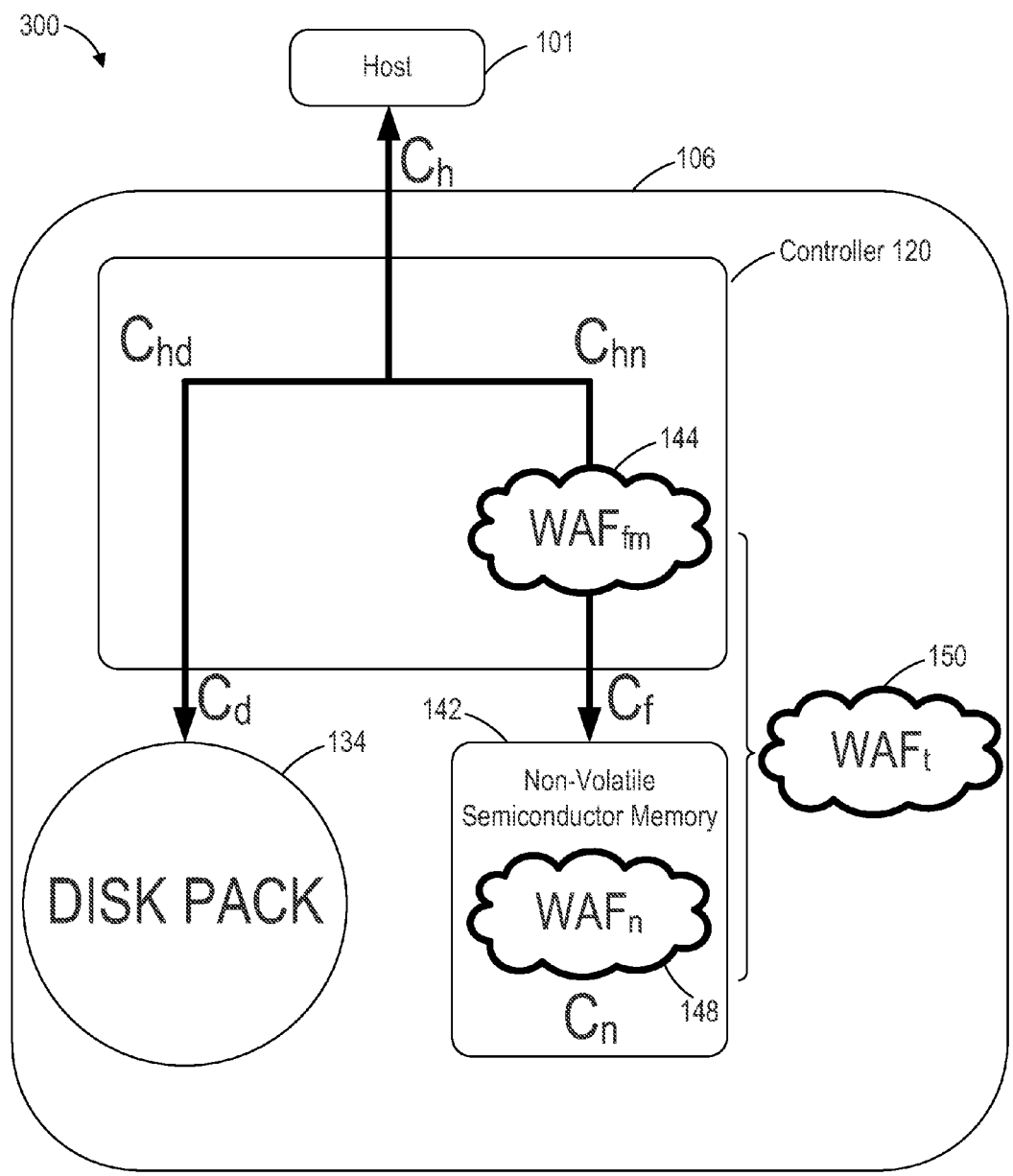
FIG. 3 is a diagram depicting relationships between data requested to be written by a host and data physically written to a non-volatile semiconductor memory (NVSM) according to an embodiment.

FIG. 3 is a diagram depicting relationships in system 300 between data requested to be written by a host 101 ($C_h$) and the resulting data actually written to NVSM 142 ($C_n$) according to an embodiment.

In one implementation, host 101 and/or controller 120 may access NVSM 142 frequently to read or write certain files stored in NVSM 142 that are frequently accessed. Host 101 may request a certain average amount of data (for example, $C_h$ gigabytes (GB) of data) to be written to DSD 106 per day. $C_h$ may depend upon, for example, data requested by a user of the host to be written. Controller 120 receives the data write request from the host 101. Controller 120 attempts to write $C_{hn}$ data to the NVSM 142 and $C_{hd}$ data to the disk pack 134. The amount of data actually written to the disk pack 134 is $C_d$. The amount of data actually written on NVSM 142 (for example, $C_n$ GB of data physically written to NVSM 142) is greater than amount of data that host 101 or controller 120 requests to be written on NVSM 142 ($C_{hn}$), due to System Write Amplification (SWAF). In an embodiment, write amplification may be adaptively determined based on $C_h$ and $C_n$ or based on $C_{hn}$ and $C_n$.

The life of NVSM 142 depends on total write amplification factor for writing on NVSM 142 ($WAF_t$). $WAF_t$ defines the relationship between $C_{hn}$ and $C_n$ as follows: $C_n = C_{hn} * WAF_t$, such that $WAF_t$ is the ratio of $C_n/C_{hn}$. In other embodiments, the inverse ratio, or mathematical and/or logical relationships between at least $C_n$ and $C_{hn}$ may be utilized for determining $WAF_t$. Write amplification factors other than $WAF_t$ may affect the relationship between $C_n$ and $C_{hn}$ or $C_n$ and $C_{hn}$. Alternatively, another write amplification factor may be determined based on a relationship between $C_n$ and $C_h$ or $C_n$ and $C_{hn}$, which may incorporate various factors at different stages between a request of host 101 to write data and the physical writing of data to NVSM 142. For example, the write amplification factor may take into account $WAF_t$ 150, $WAF_n$ 148 (further defined below), a cache write amplification, a firmware write amplification factor (i.e., $WAF_{fm}$ 144, further defined below), other amplification parameters, and/or combinations thereof.

In the embodiment of FIG. 3, controller 120 operates firmware for writing a certain amount of data (e.g., $C_f$ GB of data) to NVSM 142. $C_f$ is greater than a portion of $C_h$ intended to be written to NVSM 142 (e.g., $C_{hn}$) due to firmware write amplification resulting from operations such as the performance of a Trim command, migration of data, or deferred writes. For example, a Trim command may allow an OS to inform NVSM 142 which blocks of data are no longer considered in use and can be marked as storing invalid or obsolete data in NVSM 142. However, performance of such a Trim command can incur an additional write overhead in updating an indirection table of NVSM. $WAF_{fm}$ 144 may be defined in one embodiment as the ratio of $C_f/C_{hn}$. In other embodiments, the inverse ratio, or other mathematical and/or logical relationships between $C_f$ and $C_{hn}$ or $C_f$ and $C_{hn}$ may be utilized for determining $WAF_{fm}$ 144.

Data physically written to NVSM 142 (for example, $C_n$ GB of data per day) is greater than $C_f$ in part due to $WAF_n$ 148. More particularly, $WAF_n$ 148 can be defined as the ratio of $C_n/C_f$. As such, the following relationship may exist between $C_n$, $C_h$, and the write amplification factors:

$C_n = C_f * WAF_n, C_f = C_{hn} * WAF_{fm}$
$C_n = C_{hn} * WAF_{fm} * WAF_n$, and
$WAF_t = WAF_{fm} * WAF_n$.

In other embodiments, different mathematical and/or logical relationships between at least $C_n$ and $C_f$ may be utilized for analyzing write amplification of NVSM 142 and/or $WAF_n$ 148.

Controller 120 may obtain certain information regarding NVSM 142 to determine the above write amplification factors (e.g., $WAF_t$ 150). In one implementation, a monitoring system is utilized for monitoring, detecting and reporting various indicators of reliability that can be used to anticipate failures in NVSM 142 and/or the disk pack 134. In such an implementation, $WAF_n$ 148 (and thereby $WAF_t$ 150) can be calculated from a first parameter and a second parameter that the monitoring system can provide regarding NVSM 142. Such a monitoring system may be a custom system, or may be based on a standardized protocol such as Self-Monitoring, Analysis and Reporting Technology (SMART), for example. For example, the first parameter may correspond to a percentage of program erase cycles (PECs). The first parameter may be, for example, in 0.01% units. The total number of bytes written to NVSM 142 may be determined as (PEC %)*(capacity of NVSM 142)*(PEC specification), where PEC specification may be a constant such as 1500 for multi-level cell partitions. As understood by those of ordinary skill in the art, other parameters can be used in different implementations.

The second parameter that SMART provides may be, for example, the total LBAs written from the point of view of the firmware or controller 120. Controller 120 may act as a host, requesting information to be written to NVSM 142. The total number of data requested by controller 120 to be written can be determined as the second parameter multiplied by a sector size.

A practical lifetime of NVSM 142 may further be determined based on a threshold number of PECs. In this regard, NVSM 142 reaches the end of its practical lifetime when the threshold number of PECs is reached. The lifetime of NVSM 142 may depend upon write amplification factors discussed above and how frequently NVSM 142 is accessed. For example, the NVSM 142 may reach an end of life mode once the number of PECs reaches 95% of a total number of PECs (e.g., the first parameter). In such an implementation, the endurance of NVSM 142 may be defined as:

Endurance=95%*(capacity of NVSM 142)*PEC specification.

Other thresholds, percentages, or values may be utilized to determine end of lifetime of NVSM 142 in other implementations.

For example, if host 101 writes $C_h$ GB of data to DSD 106 per day, $C_n$ GB of data are actually written to NVSM 142. The lifetime of NVSM 142 (in terms of number of days Z) may be calculated as:

Z=(NVSM Endurance)/$C_n$=(95%*(NVSM 142 capacity)*1500)/($C_h * WAF_{fm} * WAF_n$).

For example, if the data capacity of NVSM 142 is 16 GB with a PEC specification of 1500, the endurance may be determined as follows: 95%*16G*1500=22 terabytes written (TBW). In such an example, $WAF_{fm}$ 144 may be 0.73, with $C_h$ of 20 GB/day, and $WAF_n$ in the range of 1.1 to 2.2. A range for the practical life of NVSM 142 in this example may be calculated as follows:

An upper bound of practical life of NVSM 142=(22 TB*1024)/(20 GB*0.73*1.1)=1402 days=3.8 years.

A lower bound of practical life of NVSM 142=(22 TB*1024)/(20 GB*0.73*2.2)=701 days=1.9 years.

As discussed in more detail below, it is ordinarily possible to extend the lifetime of NVSM 142 by monitoring the amplification factors discussed above and directing a portion of data requested to be written to NVSM 142 to be written on disk pack 134. In one embodiment, the life of NVSM 142 may be extended by changing $WAF_n$ 148 and thereby $WAF_t$ 150.

Figure 4:
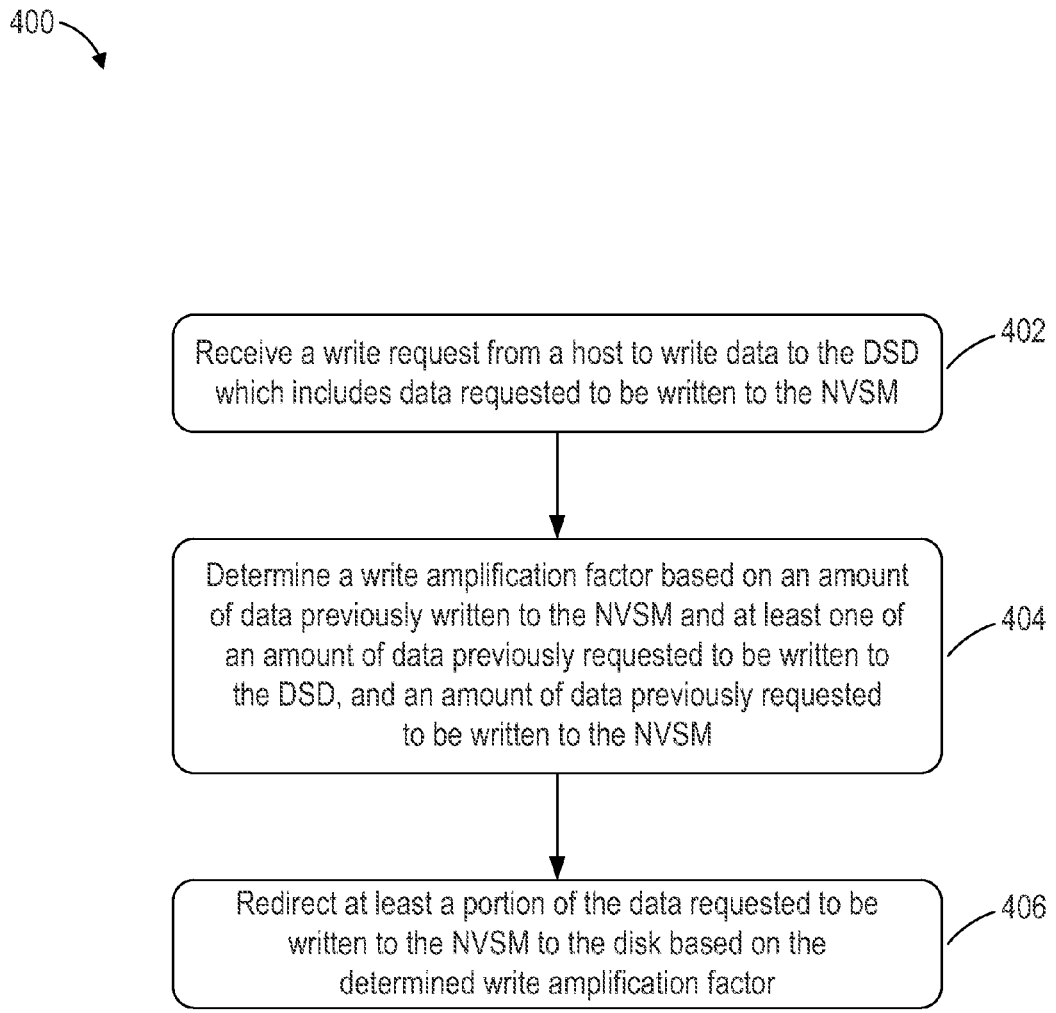
FIG. 4 is a flowchart diagram depicting an NVSM life extension process for redirecting data from an NVSM to a disk pack according to an embodiment.

FIG. 4 is a flowchart diagram depicting an NVSM life extension process for redirecting data from an NVSM to a disk pack according to an embodiment. In block 402, controller 120 receives a write request from host 101 to write data to DSD 106 which includes data requested to be written to NVSM 142. In block 404, controller 120 determines a write amplification factor based on an amount of data previously written to NVSM 142 and at least one of an amount of data previously requested to be written to the DSD 106, and an amount of data previously requested to be written to the NVSM 142. In block 406, controller 120 redirects at least a portion of the data requested to be written to the NVSM to the disk based on the determined write amplification factor. A similar process may be performed by a processor on the host in some embodiments, and DSD 106 may be configured to provide data necessary to support the actions taken by the processor.

Figure 5:
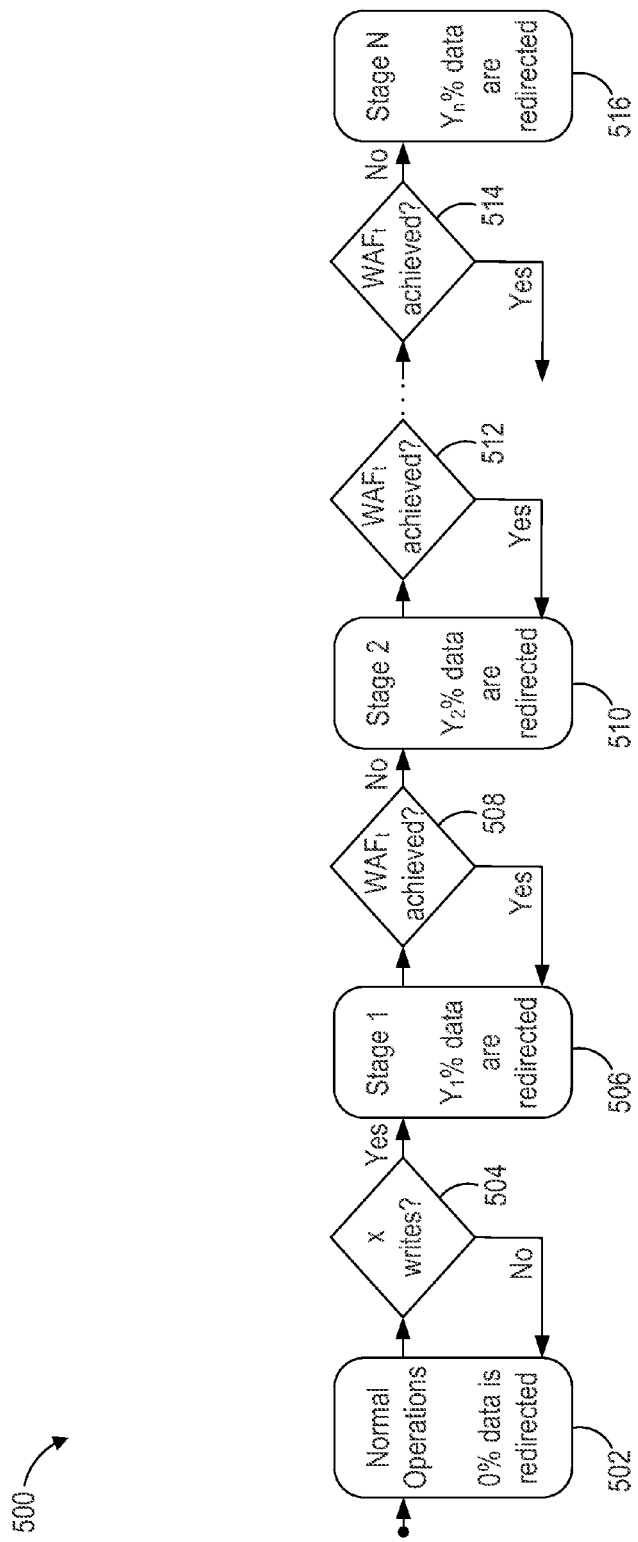
FIG. 5 is a flowchart diagram depicting an NVSM life extension process having a plurality of stages for redirecting data from an NVSM to a disk pack according to an embodiment.

FIG. 5 is a flowchart diagram depicting NVSM life extension process 500 which can be performed by controller 120 according to an embodiment. As shown in FIG. 5, NVSM life extension process 500 includes a plurality of stages for redirection of data from NVSM 142 to disk pack 134. In other words, data intended to be written to NVSM 142 may be redirected to be written to rotating media such as disk pack 134 instead. Because redirection of data to disk pack 134 may affect performance of DSD 106, the redirection may be performed in various stages as shown in FIG. 5. In the embodiment of FIG. 5, the amount of redirected data gradually increases in later stages as compared with earlier stages. In other embodiments, the amount of redirected data may remain the same or decrease in later stages as compared with earlier stages. For example, the determination to maintain or decrease the redirected data in the later stages may be based on the determined write amplification factors, data fragmentation, performance target, and/or power consumption target.

As shown in block 502, NVSM life extension process 500 may include an initial stage in which data is not redirected from NVSM 142 to disk pack 134. The initial stage may begin when DSD 106 is initially utilized for writing by the user and/or host 101. In the initial stage, NVSM life extension process 500 collects information for determining the write amplification factors discussed above with respect to FIG. 5. For example, information may be collected for determining $WAF_n$ 148 and/or $WAF_t$ 150.

As shown in block 504, NVSM life extension process 500 determines whether a certain amount of data x is requested to be written to DSD 106. When the certain amount of data x is written to DSD 106, NVSM life extension process 500 moves from the initial stage (i.e., block 502) to the first stage (i.e., block 506) to redirect data from NVSM 142 to disk pack 134.

The value of x is a design choice, and may be predetermined or adaptive. In one embodiment, x in block 502 corresponds to an amount of data written to NVSM 142. The value of x may be set to be high enough such that adequate information can be obtained for calculating the write amplification factors. The determined write amplification factor or factors may not be problematic enough in terms of reducing the lifetime of NVSM 142 during the initial use to justify a deterioration of performance and/or an additional power consumption caused by redirection of data. For example, the redirection of data from NVSM 142 to disk pack 134 may increase an overall spin time of disk pack 134, thereby resulting in higher power consumption by disk pack 134 and DSD 106 on the whole. In addition, accessing redirected data from disk pack 134 may take longer than accessing the data from its originally intended location in NVSM 142. As such, an unnecessary increase in power consumption and/or a decrease in performance may be avoided in the initial stage if the determined write amplification factor or factors do not justify redirecting data.

As shown in FIG. 5, NVSM life extension process 500 may periodically check whether x amount of data has been written to DSD 106, and if this condition is not satisfied, data may not be redirected to disk pack 134. For example, x may be determined to be 1 terabyte (TB) such that the write amplification factor is determined and compared to the target write amplification threshold roughly every 51 days if the average daily use is 20 GB. In the embodiment of FIG. 5, x may be determined from host 101's point of view (e.g., in terms of data requested to be written by host 101 since the last determination of x). In other embodiments, a period of time from the initial use of DSD 106 may be considered instead of or in addition to x. For example, NVSM life extension process 500 may recognize that 51 days has passed since the initial use of DSD 106, and may move from the initial stage to stage 1. In yet other embodiments, both x and a time period may be analyzed to determine whether NVSM life extension process 500 should move to the next stage.

In block 506, NVSM life extension process 500 enters stage 1 once the condition in block 504 is met. In stage 1, a portion of the data requested to be written to NVSM 142 may be redirected to be written to disk pack 134. For example, the first-stage redirected portion may be in terms of percentage (denoted by $y_1\%$) of data requested to be written to NVSM 142. For example, host 101 may request 15 GB of data to be written to NVSM 142 when DSD 106 is in stage 1 (block 506). If $y_1\%$ is set at 20%, then 3 GB or 20% of the 15 GB of data is redirected to be written to disk pack 134. In another embodiment, $y_1\%$ may be 10%. The various embodiments of the present invention are not limited to the percentage values described herein which are provided merely as examples. Various other portions or percentages based on design concerns such as their expected effects on performance and/or power consumption may be utilized.

In block 508, NVSM life extension process 500 periodically checks whether a currently determined write amplification factor meets a target write amplification value. As shown in block 508 of FIG. 5, the determined write amplification factor may be, for example, $WAF_t$ 150. In other embodiments, a cache write amplification factor, and/or other write amplification factors may also be considered and compared to a target write amplification value as discussed above with respect to FIG. 3.

Referring to block 508, $WAF_t$ 150 may be compared to a target write amplification value. If $WAF_t$ 150 is less than the target write amplification value, NVSM life extension process 500 remains in the current stage for preventing unnecessary deterioration of performance and/or increase in power consumption.

As discussed above with reference to block 504, the determination of $WAF_t$ 150 and/or comparison of $WAF_t$ 150 to the target write amplification value may be performed after a certain amount of data has been written on DSD 106 or NVSM 142 since the previous calculation or comparison. For example, after x amount of data is requested to be written to DSD 106 by host 101, a request may be sent from controller 120 to NVSM 142 (or a controller of NVSM 142), and NVSM 142 may report back the amount of data actually written to NVSM 142 since the previous request. The amount of data requested to be written to NVSM 142 since the previous request may also be determined. $WAF_t$ and/or other write amplification factors may be updated based on the foregoing values, for example, as discussed above with respect to FIG. 3.

In other embodiments, controller 120 may recalculate $WAF_t$ 150 in block 508 after a predetermined amount of time has passed since the previous calculation of $WAF_t$ 150 or the previous comparison of $WAF_t$ 150 to the target write amplification value. In yet other embodiments, both a predetermined time and an amount of data x may be analyzed to determine whether to move to the next stage.

Referring to block 508, if the determined current $WAF_t$ 150 is greater than a target write amplification value, NVSM life extension process 500 may move to stage 2 to redirect a higher percentage of data when the target write amplification value is not achieved. The percentage of data may be, for example, $y_2$%, which denotes the portion of the data intended to be written to NVSM 142 that is redirected to disk pack 134 in stage 2. As shown in block 510, $y_2$% of data, which is greater than $y_1$%, is redirected to disk pack 134 in stage 2.

In the embodiment discussed above with respect to block 504, NVSM life extension process 500 moves from the initial stage to stage 1 after x writes and/or a predetermined amount of time has passed. In another embodiment, after x writes and/or a predetermined amount of time has passed, NVSM life extension process 500 moves from the initial stage to stage 1 after x writes and/or a predetermined amount of time has passed if a target write amplification value is not achieved, similarly to the process described above with respect to block 508. In such an embodiment, NVSM life extension process 500 remains in the initial stage if the target write amplification value is achieved.

In block 512, $WAF_t$ 150 or other write amplification factors may be determined as discussed above with respect to block 508. The target write amplification value may be the same for stages 1 and 2. In another embodiment, the target write amplification value may be different for stage 2 based on design parameters such as performance and power consumption targets that may differ between stages 1 and 2.

As shown in FIG. 5, stage N in block 516 is the last stage of NVSM life extension process 500. In the embodiment of FIG. 5, the redirected percentage gradually increases at each stage until the last stage is reached where, in the last stage, $y_n$%=100% with all of the data being redirected to disk pack 134. In another embodiment, $y_n$% may be less than 100% of the data such that NVSM 142 remains operable for writing data.

Although redirection of data by controller 120 is discussed above, data may instead be redirected in other embodiments by host 101 to disk pack 134 to extend the lifetime of NVSM 142.

Various parameters of NVSM life extension process 500 may be determined in advance or adaptively adjusted based on operations of DSD 106. For example, the various parameters may be adjusted based on current performance and/or power consumption. In the initial stage (e.g., block 502), before data is redirected to the disk, both NVSM 142 and disk pack 134 may consume a certain amount of power. As more data is directed to disk pack 134, the power consumed for operating disk pack 134 may increase because for example, SM 138 has to consume a higher amount of energy to spin disk pack 134 to write the additional redirected data. At a certain stage (for example, stage N of block 516), writing may be completely shifted to the disks. In addition, x or an amount of time between the write amplification factor determinations may be adjusted based on power consumption and performance targets.

As shown in FIG. 5, NVSM life extension process 500 only progresses in one direction towards the later stages. In another embodiment, NVSM life extension process may move to a previous stage if it is determined that the current stage is redirecting too much data from NVSM 142 to disk pack 134. For example, the determination to move to previous stages may be based on the determined write amplification factors, performance target, and/or power consumption target.

Figure 6:
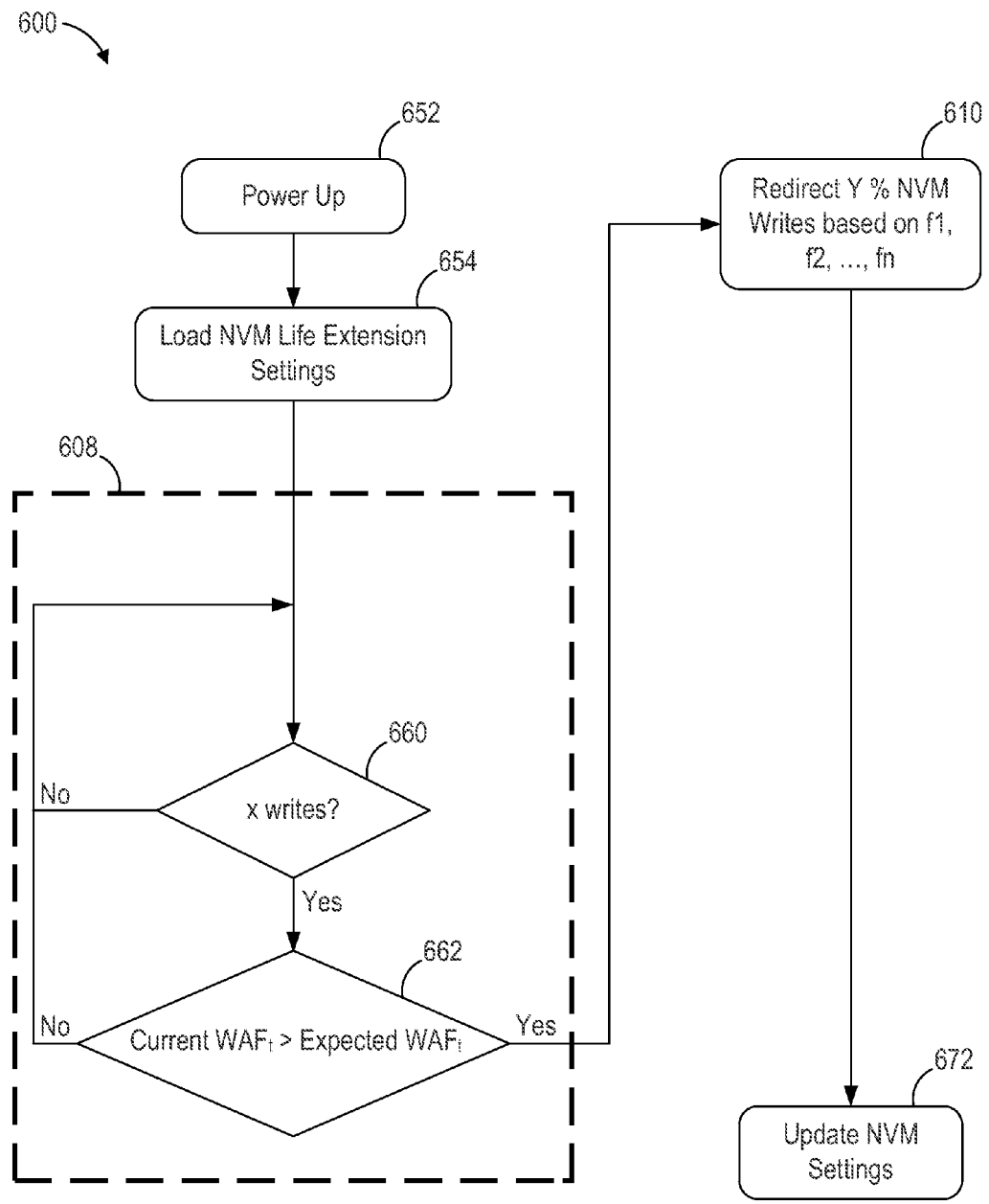
FIG. 6 is a flowchart diagram depicting an NVSM life extension process for redirecting data from an NVSM to a disk pack based on a plurality of factors according to an embodiment.

FIG. 6 is a flowchart diagram depicting NVSM life extension process 600 for redirecting data from NVSM 142 to disk pack 134 based on a plurality of factors ($f_1, f_2, \ldots f_n$) according to an embodiment.

In block 652, DSD 106 is powered on in order to read and/or write data to DSD 106. In block 654, controller 120 and/or host 101 may load settings regarding NVSM life extension process 600. The loaded settings may include stored statistics and information previously saved to DSD 106. For example, the current stage and the determined write amplification factors may be loaded.

Similarly to block 508, block 608 may determine whether a target write amplification value is achieved. For example, in block 660, NVSM life extension process 600 determines whether x amount of data has been written as discussed above with respect to FIG. 5. If so, NVSM life extension process 600 moves to block 662. In block 662, if the currently determined $WAF_t$ 150 is greater than a target or expected write amplification value, NVSM life extension process 600 moves to block 610.

In block 610, various factors ($f_1, f_2, \ldots, f_n$) may be considered and analyzed to determine what type of data and what amount of data should be redirected from NVSM 142 to disk pack 134. For example, if y % of data is to be redirected in a given stage, factors $f_1, f_2, \ldots, f_n$ may be considered to determine specifically which data should be redirected to disk pack 134. For example, in addition to or instead of priority information as discussed below with respect to FIG. 5, the frequency of use of data may be considered to determine the type of data to be redirected to the disk pack 134.

The amount and/or type of redirected data may also be based on the latency requirements of NVSM 142. Latency of accessing data may increase when data is accessed from disk pack 134 rather than from NVSM 142. The redirection of data may also be based on power requirements of NVSM 142 and/or disk pack 134, for example, by determining the current power modes. For example, if the disks are not currently spinning, data may not be redirected from NVSM 142 in order to save power.

The amount and/or type of redirected data may also be based on spatial locality of the command. For example, data may not be redirected to the disk pack 134 to avoid fragmentation and/or other undesirable effects. The redirection of data may depend on various other factors such as caching algorithms and policies.

In block 672, before DSD 106 is powered off, the statistics and information of the NVM settings are updated or saved. The settings may relate to, for example, the determined $f_1, f_2, \ldots, f_n$ and/or characteristics of amount or type of previously redirected data. For example, the loaded information discussed above with respect to block 652 may be updated and saved for future use when DSD 106 is powered on again.

Figure 7:
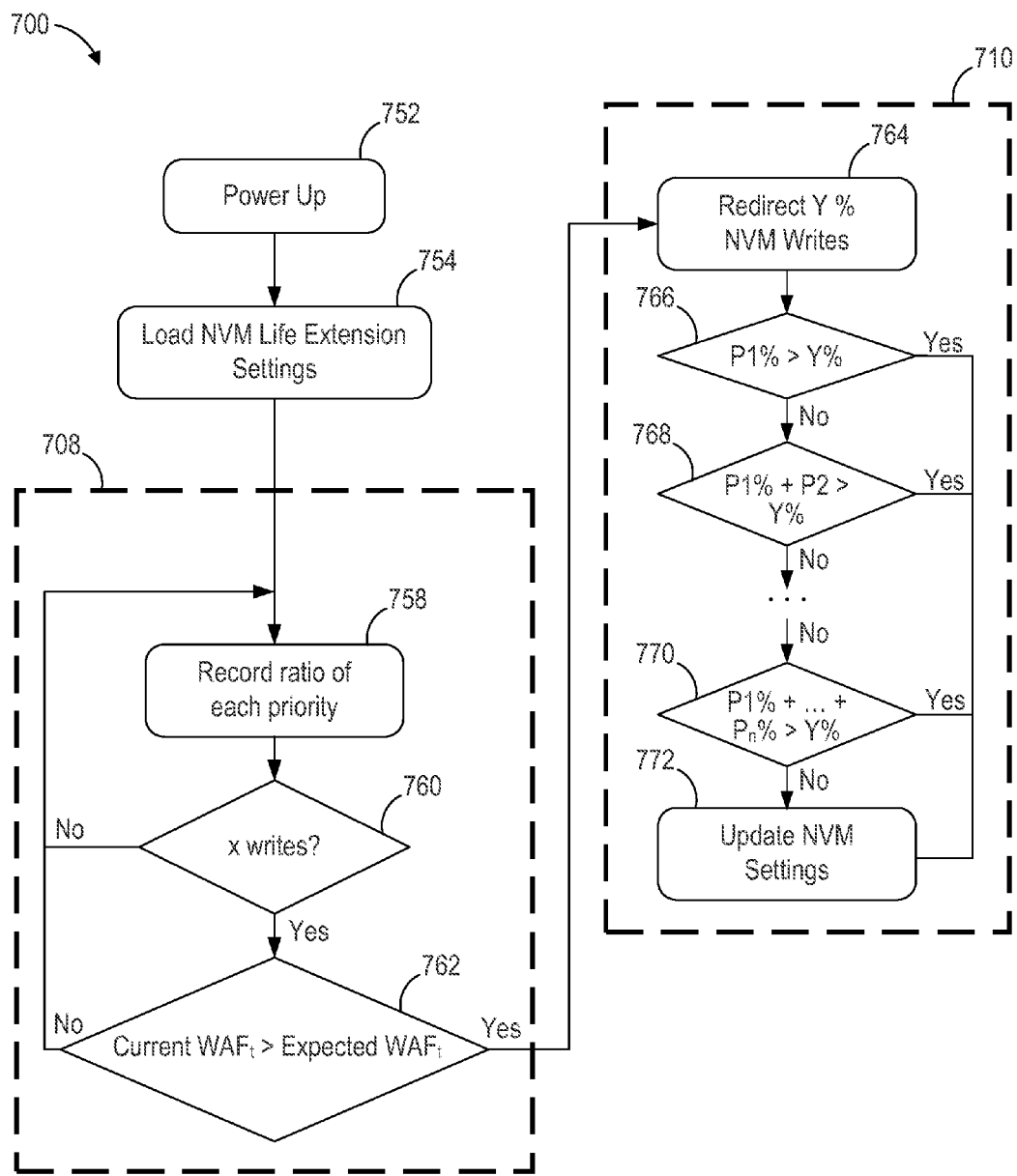
FIG. 7 is a flowchart diagram depicting an NVSM life extension process for redirecting data from NVSM to a disk pack based on a priority of data according to an embodiment.

FIG. 7 is a flowchart diagram depicting NVSM life extension process 700 for redirecting data from NVSM 142 to disk pack 134 based on a priority of data according to an embodiment. As discussed above with respect to FIGS. 5 and 6, the priority of data may be sent from host 101 (e.g., via a driver) to controller 120. As shown in FIG. 7, NVSM life extension process 700 determines the types of data that are redirected in each stage based on the priority information. Because data is redirected to disk pack 134, performance or power consumption of DSD 106 may be adversely affected initially in exchange for extending the life of NVSM 142.

By redirecting the lower priority data first to disk pack 134, NVSM life extension process 700 can enhance performance and/or reduce power consumption as compared with redirecting data without consideration of priority information.

In block 752, DSD 106 is powered on, for example, as discussed above with respect to block 652 of FIG. 6. In block 754, settings and parameters of NVSM life extension process 700 are loaded, for example, as discussed above with respect to block 654 of FIG. 6. The settings and parameters may include previously stored priority information.

Similarly to blocks 508 and 608, block 708 may periodically determine whether a target write amplification factor is achieved. Host 101 may send a request to write data to DSD 106 along with priority information regarding the data as discussed above with respect to FIG. 6. For example, there may be multiple layers of priority tiered from 0 (a lowest priority) to 7 (a highest priority). Other layers of priority and types of priority information may be utilized based on design needs. For example, system files may be indicated as having a higher priority than user data. Host 101 may indicate that a high priority is assigned to executable files (for example, *.exe files) and/or dynamic-link library (*.dll) files.

A frequency of data use may also be considered in defining priority such that more frequently accessed data is given a higher priority. However, certain types of data may be assigned a high priority regardless of its frequency of access, such as data for booting host 101 which may be assigned a higher priority even though booting of host 101 may not occur frequently. The priority information may also be based on a cache algorithm or policy.

Referring to block 758, NVSM life extension process 700 records a ratio for each level of priority in each stage. The ratio can be expressed, for example, in terms of a total amount of data that host 101 and/or controller 120 requests to be written to NVSM 142.

Referring to block 760, NVSM life extension process 700 may determine whether x amount of data has been written as discussed above with respect to FIGS. 5 and 6. If so, NVSM life extension process 700 moves to block 762. In block 762, if the currently determined $WAF_t$ 150 is greater than a target or expected write amplification value, NVSM life extension process 700 moves to block 710.

In block 710, data is redirected in each stage based on priority information. Priority information may include one of factors $f_1, f_2, \ldots, f_n$ discussed above with respect to block 610 of FIG. 6.

Referring to block 764, in each stage, a certain percentage (y %) of data intended to be written to NVSM 142 is redirected to disk pack 134. For example, y % may be any of the $y_1\%, y_2\%, \ldots, y_n\%$ corresponding to stages 1, 2, ..., N, respectively, as discussed above with respect to FIGS. 5 and 6. To redirect y % data, NVSM life extension process 500 first redirects the data associated with a lowest priority. In FIG. 7, $P_1\%$ corresponds to the percentage of data intended to be written to NVSM 142 that has the lowest priority.

In block 766, NVSM life extension process 700 determines whether there is enough data of the lowest priority to satisfy the y % data that is intended to be written to NVSM 142. If so, NVSM life extension process 700 may not redirect higher priority data to disk pack 134 in that stage.

Referring to block 768, if $P_1\%$ of data is less than y % data intended to be redirected to NVSM 142, then the data with the next higher priority is redirected as well. $P_2\%$ corresponds to the percentage of data intended to be written to NVSM 142 having the second lowest priority. If redirecting the lowest priority data and the second lowest priority data is sufficient for redirecting y % total data, NVSM life extension process 700 may not redirect any higher priority data to disk pack 134 in that stage.

Referring to block 770, if redirection of the lower priority data is insufficient for redirecting y % of data, NVSM life extension process 700 may proceed to analyze a higher priority data level until it reaches the highest priority. Referring to block 772, before DSD 106 is powered off, the NVM settings are updated or saved for future use when DSD 106 is powered on again.

The NVSM life extension processes described above ordinarily improve a long term reliability of DSD 106 while maintaining performance and power savings based on design needs. Without such NVSM life extension processes, NVSM 142 may quickly reach the end of its practical useable life.

In some embodiments, controller 120 executes firmware to perform the blocks described above with respect to FIGS. 3-7. The firmware can access information regarding NVSM 142 to determine a write amplification factor or factors. In other embodiments, a processor of host 101 performs the blocks described above with respect to FIGS. 3-7, for example, by executing a driver for DSD 106. In yet other embodiments, both host 101 and controller 120 may be utilized to perform the blocks described above with respect to FIGS. 3-7.

Figure 8:
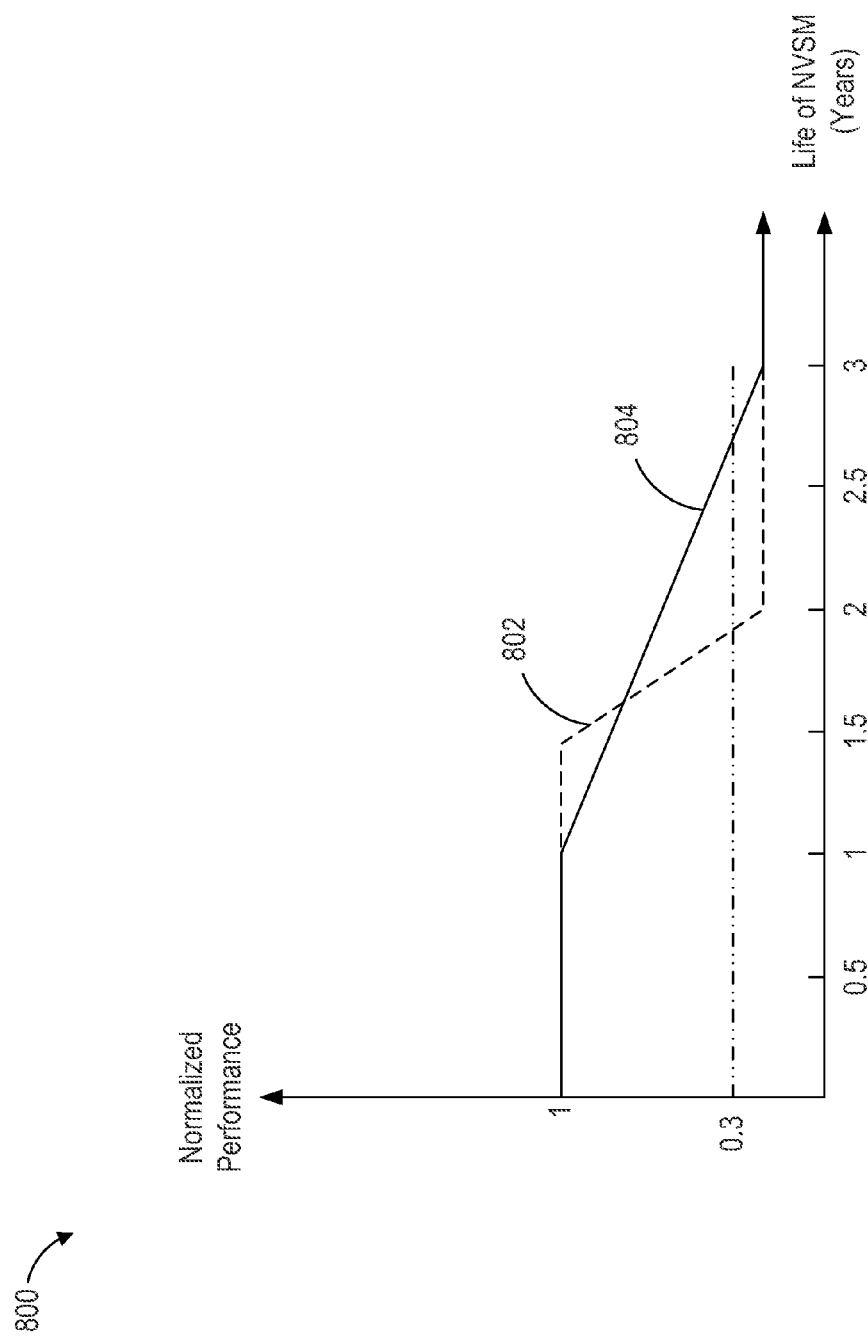
FIG. 8 is a graph comparing normalized performance of a DSD that utilizes an NVSM life extension process according to an embodiment with normalized performance of a DSD as known in the prior art.

FIG. 8 is a graph comparing (1) a normalized performance 804 of DSD 106 utilizing an NVSM life extension process according to an example embodiment with (2) a normalized performance 802 of a conventional DSD that does not utilize an NVSM life extension process. The performance as shown in FIG. 8 represents an average input/output operations per second (IOPS) that has been normalized to 1 at an initial use for both DSDs. As shown in FIG. 8, normalized performance 802 of the conventional DSD initially maintains a high level of performance but suddenly deteriorates at approximately between 1.5 and 2 years of NVSM use due to write amplification. In the example shown in FIG. 8, at least a normalized performance of 0.3 is desired during the first 2.5 years. However, by utilizing the NVSM life extension process, normalized performance 804 shows that a corresponding DSD 106 according to an embodiment maintains a higher level of performance even after 2 years of use, and performance is gradually tapered off to avoid the sudden drop seen in normalized performance 802. After year 3, normalized performance 804 remains substantially constant (for example, during years 4 and 5) at the performance level of disk pack 134 because in this example, NVSM 142 may no longer be utilized after year 3. The performance over the lifetime of NVSM 142 may vary based on the design parameters discussed above with respect to FIGS. 1-7 and based on various characteristics of DSD 106. FIG. 8 is provided as an example of the extension of the usable life of NVSM 142 to illustrate that although performance under the life extension process may slightly decrease earlier, a sudden and premature decrease in performance is ordinarily prevented.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive of the scope of the disclosure.

What is claimed is:

1. A data storage device (DSD), comprising:
    a disk for storing data;
    a non-volatile semiconductor memory (NVSM) for storing data; and
    a controller configured to:
        receive a write request from a host to write data to the DSD which includes data requested to be written to the NVSM;
        determine a write amplification factor based on an amount of data previously written to the NVSM and at least one of:
            an amount of data previously requested to be written to the DSD, and
            an amount of data previously requested to be written to the NVSM; and
        redirect at least a portion of the data requested to be written to the NVSM to the disk based on the determined write amplification factor, wherein the redirection is performed in a current stage of a plurality of successive stages with each stage defining a predetermined percentage of data to be redirected to the disk for more than one write request for data to be written to the NVSM during the stage.

2. The DSD of claim 1, wherein an amount of data redirected to the disk in the current stage is less than an amount of data redirected to the disk in a following stage of the plurality of successive stages.

3. The DSD of claim 1, wherein an amount of data redirected to the disk in the current stage is greater than or equal to an amount of data redirected to the disk in a following stage of the plurality of successive stages.

4. The DSD of claim 1, wherein the controller is further configured to:
    update the write amplification factor; and
    move from the current stage to the following stage if the write amplification factor does not meet a target write amplification value.

5. The DSD of claim 4, wherein the controller is further configured to update the write amplification factor after a predetermined amount of data is requested to be written to the DSD or after a predetermined amount of data is requested to be written to the NVSM.

6. The DSD of claim 4, wherein the controller is further configured to update the write amplification factor after a predetermined time period has elapsed.

7. The DSD of claim 1, wherein the controller is further configured to:
    receive priority data from the host corresponding to the data requested to be written to the NVSM; and
    redirect the at least a portion of the data requested to be written to the NVSM to the disk based on the received priority data.

8. The DSD of claim 7, wherein the controller is further configured to:
    determine a target amount of data to be redirected to the disk based on the determined write amplification factor;
    determine whether redirecting data with a low priority would achieve the target amount of data to be redirected based on the priority data; and
    redirect, to the disk, data requested to be written to the NVSM associated with a higher priority than the low priority if the controller determines that redirecting data with the low priority would not achieve the target amount of data to be redirected.

9. The DSD of claim 1, wherein the controller is further configured to:
    receive frequency-of-use data from the host corresponding to the data requested to be written to the NVSM; and
    redirect the at least a portion of the data to be written to the NVSM based on the received frequency-of-use data.

10. The DSD of claim 1, wherein the controller is further configured to redirect the data to be written to the NVSM based on at least one of a current power mode of the NVSM and a current power mode of the disk.

11. A method of operating a data storage device (DSD) including a non-volatile semiconductor memory (NVSM), the method comprising:
    receiving a write request from a host to write an amount of data to the DSD which includes an amount of data requested to be written to the NVSM;

determining a write amplification factor based on an amount of data previously written to the NVSM and at least one of:
an amount of data previously requested to be written to the DSD, and
an amount of data previously requested to be written to the NVSM; and
redirecting at least a portion of the amount of data requested to be written to the NVSM to a disk of the DSD based on the determined write amplification factor, wherein the redirection is performed in a current stage of a plurality of successive stages with each stage defining a predetermined percentage of data to be redirected to the disk for more than one write request for data to be written to the NVSM during the stage.

12. The method of claim 11, wherein an amount of data redirected to the disk in the current stage is less than an amount of data redirected to the disk in a following stage of the plurality of successive stages.

13. The method of claim 11, wherein an amount of data redirected to the disk in the current stage is greater than or equal to an amount of data redirected to the disk in a following stage of the plurality of successive stages.

14. The method of claim 11, further comprising:
updating the write amplification factor; and
moving from the current stage to the following stage if the write amplification factor does not meet a target write amplification value.

15. The method of claim 14, wherein the updating the write amplification factor is performed after a predetermined amount of data is requested to be written to the DSD or after a predetermined amount of data is requested to be written to the NVSM.

16. The method of claim 14, wherein the updating the write amplification factor is performed after a predetermined time period has elapsed.

17. The method of claim 11, further comprising receiving priority data from the host corresponding to the data requested to be written to the NVSM, wherein the redirecting at least a portion of the amount of data requested to be written to the NVSM to the disk is based on the received priority data.

18. The method of claim 17, further comprising:
determining a target amount of data to be redirected to the disk based on the determined write amplification factor; and
determining whether redirecting data with a low priority would achieve the target amount of data to be redirected based on the priority data,
wherein the redirecting at least a portion of the amount of data requested to be written to the NVSM to the disk includes redirecting, to the disk, data requested to be written to the NVSM associated with a higher priority than the low priority if redirecting data with the low priority would not achieve the target amount of data to be redirected.

19. The method of claim 11, further comprising:
receiving frequency-of-use data from the host corresponding to the data requested to be written to the NVSM, wherein the redirecting at least a portion of the amount of data requested to be written to the NVSM to the disk is based on the received frequency-of-use data.

20. The method of claim 11, wherein the redirecting at least a portion of the amount of data requested to be written to the NVSM to the disk is based on at least one of a current power mode of the NVSM and a current power mode of the disk.

21. A host in communication with a data storage device (DSD) including a disk for storing data and a non-volatile semiconductor memory (NVSM) for storing data, the host comprising:
an interface for receiving from the DSD an amount of data previously written to the NVSM; and
a processor configured to:
determine a write amplification factor based on the amount of data previously written to the NVSM and at least one of:
an amount of data previously requested to be written to the DSD, and
an amount of data previously requested to be written to the NVSM;
determine an amount of data to be written to the DSD;
direct at least a portion of the amount of data to be written to the DSD to the disk based on the write amplification factor; and
increase the amount of data directed to the NVSM if the write amplification factor does not meet a target write amplification value.

22. The host of claim 21, wherein the processor is further configured to direct the at least a portion of the amount of data to be written to the DSD to the NVSM based on priority data corresponding to the amount of data to be written to the DSD.

23. A method for writing data to a data storage device (DSD) including a disk for storing data and a non-volatile semiconductor memory (NVSM) for storing data, the method comprising:
receiving from the DSD an amount of data previously written to the NVSM;
determining a write amplification factor based on the amount of data previously written to the NVSM and at least one of:
an amount of data previously requested to be written to the DSD, and
an amount of data previously requested to be written to the NVSM;
determining an amount of data to be written to the DSD;
directing at least a portion of the amount of data to be written to the NVSM to the disk based on the write amplification factor; and
increasing the amount of data directed to the NVSM if the write amplification factor does not meet a target write amplification value.

24. The method of claim 23, wherein the directing at least a portion of the amount of data to be written to the NVSM to the disk is based on priority data corresponding to the amount of data to be written to the NVSM.

* * * * *